(12) United States Patent
Marrion et al.

(10) Patent No.: US 7,920,718 B2
(45) Date of Patent: Apr. 5, 2011

(54) MULTI-ZONE PASSAGEWAY MONITORING SYSTEM AND METHOD

(75) Inventors: Cyril C. Marrion, Acton, MA (US);
Raymond A. Fix, Natick, MA (US);
Sanjay Nichani, San Diego, CA (US)

(73) Assignee: Cognex Corporation, Natick, MA (US)

( * ) Notice: Subject to any disclaimer, the term of this patent is extended or adjusted under 35 U.S.C. 154(b) by 401 days.

(21) Appl. No.: 11/754,697

(22) Filed: May 29, 2007

(65) Prior Publication Data

US 2008/0100438 A1 May 1, 2008

Related U.S. Application Data

(63) Continuation-in-part of application No. 10/749,335, filed on Dec. 31, 2003, now Pat. No. 7,397,929, which is a continuation-in-part of application No. 10/388,925, filed on Mar. 14, 2003, now Pat. No. 7,400,744.

(60) Provisional application No. 60/408,266, filed on Sep. 5, 2002.

(51) Int. Cl.
*G06K 9/00* (2006.01)
*H04N 7/18* (2006.01)
*G08B 13/08* (2006.01)
*G08B 21/00* (2006.01)

(52) U.S. Cl. ...... 382/103; 348/143; 340/540; 340/545.1

(58) Field of Classification Search .................. 382/103; 348/143; 340/540, 541, 545.1, 573.1
See application file for complete search history.

(56) References Cited

U.S. PATENT DOCUMENTS

| | | | |
|---|---|---|---|
| 3,727,034 A | 4/1973 | Pope | |
| 3,779,178 A | 12/1973 | Riseley | |
| 3,852,592 A | 12/1974 | Scoville et al. | |
| 4,000,400 A | 12/1976 | Elder | |
| 4,303,851 A | 12/1981 | Mottier | |
| 4,382,255 A | 5/1983 | Pretini | |
| 4,481,887 A | 11/1984 | Urbano | |
| 4,570,181 A | 2/1986 | Yamamura | |
| 4,782,384 A | 11/1988 | Tucker et al. | |
| 4,799,243 A | 1/1989 | Zepke | |
| 4,814,884 A | 3/1989 | Johnson et al. | |
| 4,823,010 A | 4/1989 | Kornbrekke et al. | |

(Continued)

FOREIGN PATENT DOCUMENTS

DE 19709799 10/1997

(Continued)

OTHER PUBLICATIONS

PCT/US2008/064395; International Search Report; 3 pgs.

(Continued)

*Primary Examiner* — John B Strege

(57) ABSTRACT

A method, computer program product, and machine vision system for monitoring an activity area proximate an actuated passageway for the occurrence of an object-related event. The activity area includes a first activity zone and at least a second activity zone. The first and the at least a second activity zones are essentially parallel to the activity area. The actuated passageway is actuatable with a control signal. The occurrence of an object-related event is detected within the activity area. If the object-related event occurs within the first activity zone, a first algorithm is executed to generate the control signal. If the object-related event occurs within the at least a second activity zone, a second algorithm is executed to generate the control signal.

12 Claims, 8 Drawing Sheets

U.S. PATENT DOCUMENTS

| | | | |
|---|---|---|---|
| 4,847,485 | A | 7/1989 | Koelsch |
| 4,931,864 | A | 6/1990 | Kawamura et al. |
| 4,967,083 | A | 10/1990 | Kornbrekke et al. |
| 4,998,209 | A | 3/1991 | Vuichard et al. |
| 5,097,454 | A | 3/1992 | Schwarz et al. |
| 5,142,152 | A * | 8/1992 | Boiucaner ............... 250/341.7 |
| 5,196,929 | A | 3/1993 | Miyasaka |
| 5,201,906 | A | 4/1993 | Schwarz et al. |
| 5,282,045 | A | 1/1994 | Mimura et al. |
| 5,333,011 | A | 7/1994 | Thompson et al. |
| 5,387,768 | A | 2/1995 | Izard et al. |
| 5,432,712 | A | 7/1995 | Chan |
| 5,519,784 | A | 5/1996 | Vermeulen et al. |
| 5,552,823 | A | 9/1996 | Kageyama |
| 5,559,551 | A | 9/1996 | Sakamoto et al. |
| 5,565,918 | A | 10/1996 | Homma et al. |
| 5,581,625 | A | 12/1996 | Connell |
| 5,625,415 | A | 4/1997 | Ueno et al. |
| 5,866,887 | A | 2/1999 | Hashimoto et al. |
| 5,880,782 | A | 3/1999 | Koyanagi et al. |
| 6,014,167 | A | 1/2000 | Suito et al. |
| 6,028,626 | A | 2/2000 | Aviv et al. |
| 6,031,934 | A | 2/2000 | Ahmad et al. |
| 6,081,619 | A | 6/2000 | Hashimoto et al. |
| 6,173,070 | B1 | 1/2001 | Michael et al. |
| 6,195,102 | B1 | 2/2001 | McNeil et al. |
| 6,205,233 | B1 | 3/2001 | Morley et al. |
| 6,205,242 | B1 | 3/2001 | Onoguchi et al. |
| 6,215,898 | B1 | 4/2001 | Woodfill et al. |
| 6,226,396 | B1 | 5/2001 | Marugame et al. |
| 6,295,367 | B1 | 9/2001 | Crabtree et al. |
| 6,297,844 | B1 | 10/2001 | Schatz et al. |
| 6,301,440 | B1 | 10/2001 | Bolle et al. |
| 6,307,951 | B1 | 10/2001 | Tanigawa et al. |
| 6,308,644 | B1 | 10/2001 | Diaz |
| 6,345,105 | B1 | 2/2002 | Nitta et al. |
| 6,362,875 | B1 | 3/2002 | Burkley |
| 6,370,262 | B1 | 4/2002 | Kawabata |
| 6,408,109 | B1 | 6/2002 | Silver et al. |
| 6,469,734 | B1 | 10/2002 | Nichani et al. |
| 6,496,204 | B1 | 12/2002 | Nakamura |
| 6,496,220 | B2 | 12/2002 | Landert et al. |
| 6,678,394 | B1 | 1/2004 | Nichani |
| 6,690,354 | B2 | 2/2004 | Sze |
| 6,701,005 | B1 | 3/2004 | Nichani |
| 6,710,770 | B2 | 3/2004 | Tomasi et al. |
| 6,720,874 | B2 | 4/2004 | Fufido et al. |
| 6,756,910 | B2 | 6/2004 | Ohba et al. |
| 6,791,461 | B2 | 9/2004 | Oku et al. |
| 6,829,371 | B1 | 12/2004 | Nichani et al. |
| 6,919,549 | B2 | 7/2005 | Bamji et al. |
| 6,940,545 | B1 | 9/2005 | Ray et al. |
| 6,963,661 | B1 | 11/2005 | Hattori et al. |
| 6,999,600 | B2 | 2/2006 | Venetianer et al. |
| 7,003,136 | B1 | 2/2006 | Harville |
| 7,042,492 | B2 | 5/2006 | Spinelli |
| 7,058,204 | B2 | 6/2006 | Hildreth et al. |
| 7,088,236 | B2 | 8/2006 | Sorensen |
| 7,146,028 | B2 | 12/2006 | Lestideau |
| 7,260,241 | B2 | 8/2007 | Fukuhara et al. |
| 7,382,895 | B2 | 6/2008 | Bramblet et al. |
| 7,471,846 | B2 | 12/2008 | Steinberg et al. |
| 7,538,801 | B2 | 5/2009 | Hu |
| 2001/0010731 | A1 | 8/2001 | Miyatake et al. |
| 2001/0030689 | A1 | 10/2001 | Spinelli |
| 2002/0039135 | A1 | 4/2002 | Heyden |
| 2002/0041698 | A1 | 4/2002 | Ito et al. |
| 2002/0113862 | A1 | 8/2002 | Center et al. |
| 2002/0118113 | A1 | 8/2002 | Oku et al. |
| 2002/0118114 | A1 | 8/2002 | Ohba et al. |
| 2002/0135483 | A1 | 9/2002 | Merheim et al. |
| 2002/0145667 | A1 | 10/2002 | Horiuchi |
| 2002/0191819 | A1 | 12/2002 | Hashimoto et al. |
| 2003/0053660 | A1 | 3/2003 | Heyden |
| 2003/0071199 | A1 | 4/2003 | Esping et al. |
| 2003/0164892 | A1 | 9/2003 | Shiraishi et al. |
| 2004/0017929 | A1 | 1/2004 | Bramblet et al. |
| 2004/0036596 | A1 | 2/2004 | Heffner et al. |
| 2004/0045339 | A1 | 3/2004 | Nichani et al. |
| 2004/0061781 | A1 | 4/2004 | Fennell et al. |
| 2004/0086152 | A1 | 5/2004 | Kakarala et al. |
| 2004/0153671 | A1 | 8/2004 | Schuyler et al. |
| 2004/0218784 | A1 | 11/2004 | Nichani et al. |
| 2005/0074140 | A1 | 4/2005 | Grasso et al. |
| 2005/0078853 | A1 | 4/2005 | Buehler et al. |
| 2005/0105765 | A1 | 5/2005 | Han et al. |
| 2005/0128314 | A1 | 6/2005 | Ishino |
| 2005/0249382 | A1 | 11/2005 | Schwab et al. |
| 2006/0139453 | A1 | 6/2006 | Spinelli |
| 2006/0170769 | A1 | 8/2006 | Zhou |
| 2006/0244403 | A1 | 11/2006 | Christensson et al. |
| 2007/0047837 | A1 | 3/2007 | Schwab |

FOREIGN PATENT DOCUMENTS

| | | |
|---|---|---|
| EP | 0847030 | 6/1998 |
| EP | 1035510 | 9/2000 |
| EP | 0706062 | 5/2001 |
| EP | 0817123 | 9/2001 |
| EP | 1 313 321 A1 | 5/2003 |
| WO | 9631047 | 10/1996 |
| WO | 9638820 | 12/1996 |
| WO | 9808208 | 2/1998 |
| WO | 0175809 | 10/2001 |
| WO | 0248971 | 6/2002 |
| WO | 02095692 | 11/2002 |
| WO | 2004/023782 A2 | 3/2004 |
| WO | 2006/067222 A2 | 6/2006 |

OTHER PUBLICATIONS

CSEM SA, Swiss Ranger SR-2 Datasheet, CSEM Technologies for Innovation, www.csem.ch, imaging@csem.ch, Bandenerstrasse 569, CH 8048, Zurich, Switzerland, 2004.

Pilz GmbH & Co., Safe camera system SafetyEye, http://www.pilz_com/products/sensors/camera/f/safetyeye/sub/applicationslindex.en.jsp, 2007.

Roeder-Johnson Corporation, Low-cost, Broadly-Available Computer/Machine Vision Applications Much Closer with New Canesta Development Platform, Press Release, San Jose, CA, Aug. 10, 2004.

CEDES, News from the CEDES World, 2009 newsletters.

Canesta, Inc., Development Platform—DP200, Electronic Perception Technology, Real-time single chip 3D imaging, Jul. 12, 2004.

Burschka, et al, Scene Classification from Dense Disparity Mapis in Indoor Environments, Proceedings of ICPR 2002.

Dhond, et al, Structure from Stereo—A Review, IEEE Transactions on Systems, Man, and Cybernetics, vol. 19 No. 6, Dec. 1989.

Gluckman, Joshua, et al, Planar Catadioptric Stereo: Geometry and Calibration, IEEE, 1999.

Gurovich, Alexander, et al, Automatic Door Control using Motion Recognition, Technion, Israel Institute of Technology, Aug. 1999.

Jain, et al, Machine Vision, Chapter 11-Depth, MIT Press and McGraw-Hill Inc. 1995, pp. 289-297.

Kalman, R. E., A New Approach to Linear Filtering and Prediction Problems, Transactions of the ASME, The Journal of Basic Engineering, 8, Ref. Pages pp. 35-45, 1960.

Kanade, T., et al., A Stereo Machine for Video-rate Dense Depth Mapping and Its New Applications, Proc. IEEE Computer Vision and pattern Recognition, pp. 196-202, 1996.

Norris, Jeffery, Face Detection and Recognition in Office Environments, Department of Electrical Engineering and Computer Science, Massachusetts Institute of Technology, May 21, 1999.

Pollard, Stephen P., et al., A Stereo Correspondence Algorithm using a disparity gradient limit Perception, vol. 14, pp. 449-470, 1985.

Prati, A., et al., Detecting Moving Shadows: Algorithms and Evaluations, IEEE Transactions on Pattern Analysis and Machine Intelligence, vol. 25, No. 7. pp. 918-923, 2003.

Tsai, R. Y., A Versatile Camera Calibration Technique for High-Accuracy 3D Machine vision Metrology using off-the-shelf TV Cameras and Lenses, IEEE J. Robotics and Automation, vol. 3, No. 4, pp. 323-344 Aug. 1987.

Weng, Agglomerative Clustering Algorithm, www.speech.sri.com, Publication Date 1997.

Zhang, Z., A Flexible New Technique for Camera Calibration, Technical Report MSR-TR-98-71, Microsoft Research, Microsoft Corporation, pp. 1-22, Publication Date Mar. 25, 1996.

Cognex Corporation, PeopleSensor 3.2, release notes, and set up utility, 2004.

PCT/US2008/064305, Oct. 2009, International Search Report; 3 pgs.

Beynon, et al., Detecting abandoned packages in a multi-camera video surveillance system, Advanced Video and Signal Based Surveillance, 2003 Proceedings, IEEE Conference on Jul. 21-22, 2003, pp. 221-228 XP010648388 ISBN: 0-7695-1971-7.

* cited by examiner

MULTI-ZONE PASSAGEWAY MONITORING SYSTEM AND METHOD

RELATED APPLICATION(S)

This disclosure is a continuation-in-part of U.S. patent application Ser. No. 10/749,335, filed 31 Dec. 2003 now U.S. Pat. No. 7,397,929; which claims the priority of and is a continuation-in-part of U.S. patent application Ser. No. 10/388,925, filed 14 Mar. 2003 now U.S. Pat No. 7,400,744; which claims the priority of U.S. Provisional Patent Application No. 60/408,266, filed 5 Sep. 2002. Each of the above-listed applications is herein explicitly incorporated by reference.

TECHNICAL FIELD

The present disclosure relates to machine vision systems and, more particularly, to multi-zone machine vision systems for monitoring passageways.

BACKGROUND

The movement of people and/or objects through various spaces and passageways may be monitored and/or controlled for any number of purposes including safety and security. Such monitoring and/or control may be performed most efficiently when it is done automatically by machine with little or no human interventions.

Various sensors are known for use in automatic object detection systems. For example, photovoltaic sensors may detect objects interrupting a beam of visible or invisible (e.g., ultraviolet) light; mechanical switches and load cells may detect objects through direct or indirect contact or by detecting the weight of an object; thermal sensors may detect objects radiating heat; and electromagnetic sensors may detect objects that alter electromagnetic fields (e.g., metallic objects). These sensors may send signals to logic circuits that control mechanical actuators, record the presence of the object and/or alert an operator based on the presence or absence of an object.

Such sensors may not be well suited for certain security systems because they are easily circumvented; they only detect a certain class of objects moving through a narrowly constrained space; and they cannot directly determine the direction and/or velocity of an object. These sensors may have problems maintaining uniform sensitivity throughout a monitored space and/or over time and may be prohibitively expensive.

Various camera-based systems may be used within object detection systems and control systems (e.g., in security and/or safety applications). Camera-based systems may have the additional advantage of providing an image of the monitored space that may be stored for later analysis. Such camera-based systems typically use an electronic camera (e.g., still or video) that captures images on an array of charge coupled devices (i.e., CCDs) and converts the captured images into electronic data files for automatic analysis and/or storage.

Motion detection systems have been developed using electronic video cameras and frame capturing processes that detect and/or track certain features in each frame of a captured video sequence. For example, automatic door control systems may track the corners of an object from frame to frame and may calculate a velocity vector for the object. This velocity vector may be used to determine whether to open or close an automatic door.

Such systems (e.g., the corner tracking system described above) may extract data from a monocular image sequence. Such monocular systems may provide only 2 dimensional (i.e., 2d) images from which to compute velocity vectors. Such monocular systems may have difficulty distinguishing e.g., shadows and lighting effects from actual 3-dimensional (i.e., 3d) objects. This problem may be exacerbated in certain security systems wherein e.g., a pre-alarm condition triggers a warning strobe light that affects detected images of the monitored space.

Monocular video monitoring systems operating on 2d image data may need to tolerate blind spots and/or blind intervals during which regular obstructions appear in the field of view of the camera. For example, some doors or door-frames being controlled by monocular video systems may come into the field of view of the monitoring cameras whenever they are opened. Some systems may be programmed to ignore frames and/or frame segments whenever the door is opened. Other more-refined systems may use additional sensors to detect the actual position of a door over time and ignore only the portions of a frame where the door and/or door frame is expected to appear.

Additionally, when monocular video monitoring systems are initially installed, the systems may require "training" using e.g., a reference image in order to establish a frame of reference appropriate to the particular environment. Such training may involve tedious and expensive procedures.

SUMMARY OF THE DISCLOSURE

In one implementation, a method includes monitoring an activity area proximate an actuated passageway for the occurrence of an object-related event. The activity area includes a first activity zone and at least a second activity zone. The first and the at least a second activity zones are essentially parallel to the activity area. The actuated passageway is actuatable with a control signal. The occurrence of an object-related event is detected within the activity area. If the object-related event occurs within the first activity zone, a first algorithm is executed to generate the control signal. If the object-related event occurs within the at least a second activity zone, a second algorithm is executed to generate the control signal.

One or more of the following features may also be included. The at least a second activity zone may include a second activity zone and a third activity zone. The first activity zone may be a presence activity zone. The second activity zone may be a movement activity zone. The third activity zone may be a direction activity zone. The object-related event may be chosen from the group consisting of a presence-related event; a movement-related event; and a direction-related event.

If the object-related event is a presence-related event that occurs in the presence activity zone, an open control signal may be generated that is provided to the actuated passageway. If the object-related event is a movement-related event that occurs in the movement activity zone, an open control signal may be generated that is provided to the actuated passageway. If the object-related event is a direction-related event that occurs in the direction activity zone, an open control signal may be generated that is provided to the actuated passageway.

The activity area may include a ground level activity zone. If the object-related event occurs within the ground level activity zone, a third algorithm may be executed to generate the control signal.

In another implementation, a computer program product resides on a computer readable medium and has a plurality of instructions stored on it that, when executed by a processor, cause the processor to perform operations including monitoring an activity area proximate an actuated passageway for the occurrence of an object-related event. The activity area includes a first activity zone and at least a second activity zone. The first and the at least a second activity zones are essentially parallel to the activity area. The actuated passageway is actuatable with a control signal. The occurrence of an object-related event is detected within the activity area. If the object-related event occurs within the first activity zone, a first algorithm is executed to generate the control signal. If the object-related event occurs within the at least a second activity zone, a second algorithm is executed to generate the control signal.

One or more of the following features may also be included. The at least a second activity zone may include a second activity zone and a third activity zone. The first activity zone may be a presence activity zone. The second activity zone may be a movement activity zone. The third activity zone may be a direction activity zone. The object-related event may be chosen from the group consisting of a presence-related event; a movement-related event; and a direction-related event.

If the object-related event is a presence-related event that occurs in the presence activity zone, an open control signal may be generated that is provided to the actuated passageway. If the object-related event is a movement-related event that occurs in the movement activity zone, an open control signal may be generated that is provided to the actuated passageway. If the object-related event is a direction-related event that occurs in the direction activity zone, an open control signal may be generated that is provided to the actuated passageway.

The activity area may include a ground level activity zone. If the object-related event occurs within the ground level activity zone, a third algorithm may be executed to generate the control signal.

In another implementation, a machine vision system includes a plurality of cameras and logic circuitry responsive to the plurality of cameras. The logic circuitry is configured for: monitoring an activity area proximate an actuated passageway for the occurrence of an object-related event. The activity area includes a first activity zone and at least a second activity zone. The first and the at least a second activity zones are essentially parallel to the activity area. The actuated passageway is actuatable with a control signal. The occurrence of an object-related event is detected within the activity area. If the object-related event occurs within the first activity zone, a first algorithm is executed to generate the control signal. If the object-related event occurs within the at least a second activity zone, a second algorithm is executed to generate the control signal.

One or more of the following features may also be included. The at least a second activity zone may include a second activity zone and a third activity zone. The first activity zone may be a presence activity zone. The second activity zone may be a movement activity zone. The third activity zone may be a direction activity zone. The object-related event may be chosen from the group consisting of a presence-related event; a movement-related event; and a direction-related event.

If the object-related event is a presence-related event that occurs in the presence activity zone, an open control signal may be generated that is provided to the actuated passageway. If the object-related event is a movement-related event that occurs in the movement activity zone, an open control signal may be generated that is provided to the actuated passageway. If the object-related event is a direction-related event that occurs in the direction activity zone, an open control signal may be generated that is provided to the actuated passageway.

The activity area may include a ground level activity zone. If the object-related event occurs within the ground level activity zone, a third algorithm may be executed to generate the control signal.

The details of one or more implementations are set forth in the accompanying drawings and the description below. Other features and advantages will become apparent from the description, the drawings, and the claims.

DETAILED DESCRIPTION OF THE ILLUSTRATIVE EMBODIMENTS

Figure 1:
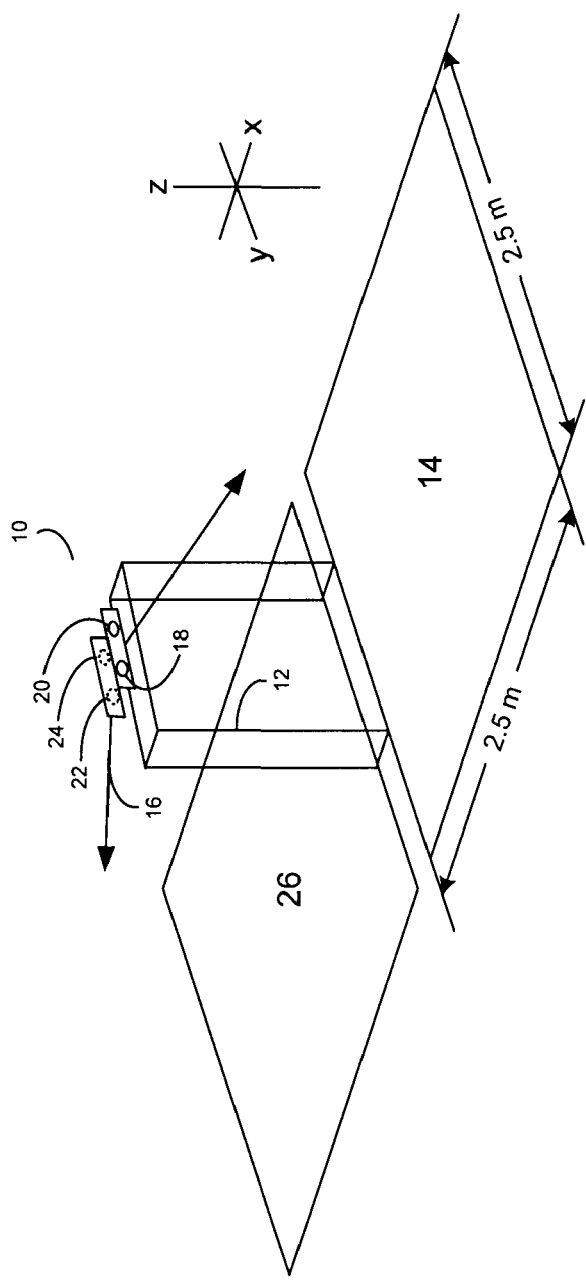
FIG. 1 is a diagrammatic view of a machine vision system.

Referring to FIG. 1, there is shown a machine vision system 10 mounted above an actuatable passageway 12, wherein a pair of cameras are positioned so that they look downward and outward towards an incoming area 14 (e.g., the area directly in front of passageway 12). Optionally, another pair of cameras may be mounted on the other side of passageway 12 looking at an outgoing area (i.e., in the direction of arrow 16). Machine vision system 10 may include a plurality of discrete cameras (e.g., cameras 18, 20). While machine vision system 10 is shown to include two cameras (namely cameras 18, 20), this is for illustrative purposes only and is not intended to be a limitation of this disclosure, as the number of cameras may be increased/decreased pursuant to various design requirements.

Machine vision system 10 may be calibrated to adjust for the height of machine vision system 10 with respect to the ground plane. Therefore, when an object enters the field of view of machine vision system 10, machine vision system 10 may generate interest points (called "features"), wherein the height of each feature is determined relative to the ground plane. These interest points may then be clustered in 3d space to define "objects". These objects may then be tracked in multiple frames to determine the "trajectory" of each individual object. Machine vision system 10 may then initiate an event (e.g., the sounding of an alarm and/or the opening/closing of a door) based on the various pieces of information generated concerning one or more of the defined objects.

In a illustrative embodiment, machine vision system 10 may include two or three discrete cameras (e.g., cameras 18, 20) configured to view incoming area 14. Additionally, a second set of cameras 22, 24 may be configured for viewing outgoing area 26. Machine vision system 10 may be mounted above and/or on either side of passageway 12 and may be configured to look downward and outward from passageway 12.

In a illustrative embodiment of machine vision system 10, the baseline distance between the optical centers of e.g., cameras 18, 20 is 12 centimeters and the lenses have a focal length of 2-4 mm with a 70°-90° Horizontal Field of View (HFOV). Machine vision system 10 may be mounted approximately about 2.2 meters above the ground and may have a viewing area (e.g., incoming area 14 and/or outgoing area 24) that is approximately 2.5 meters by 2.5 meters. The surface normal to the plane of the cameras may point downward and outward (as shown in FIG. 1), such that e.g., cameras 18, 20 are angled downward to allow for viewing on the bottom of passageway 12. Additionally, cameras 18, 20 may be angled so that, in addition to viewing incoming area 14, the portion of outgoing area 24 that is closest to passageway 12 may also be viewable.

Figure 2:
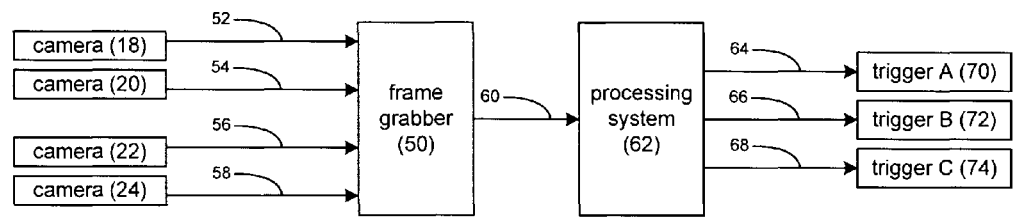
FIG. 2 is a diagrammatic view of one or more system level components of the machine vision system of FIG. 1.

Referring also to FIG. 2, machine vision system 10 may include a plurality of discrete electrical, mechanical and/or electromechanical components. As is known in the art, these components may be tightly integrated into a single device or may be dispersed among multiple devices. For example, all of the components of machine vision system 10 may be included within the device that mounts above passageway 12 (as shown in FIG. 1). Alternatively, machine vision system 10 may include multiple components. For example, the device mounted above passageway 12 may merely include cameras 18, 20, 22, 24 and a separate system component (not shown) may include e.g., processor components, and memory components.

Machine vision system 10 may include a frame grabber 50 for receiving input signals from a plurality of cameras monitoring e.g., incoming area 14 and outgoing area 24. For example, frame grabber 50 may receive inputs signals 52, 54, 56, 58 from both incoming area cameras 18, 20 and outgoing area cameras 22, 24. Framer grabber 50 may provide data signal 60 to processing system 62. Processing system 62 may provide one or more output signals (e.g., output signals 64, 66, 68) to one or more triggers 70, 72, 74. Triggers 70, 72, 74 may perform various functions, such as opening a door, closing a door, calling security, and sounding an alarm, for example.

Figure 3:
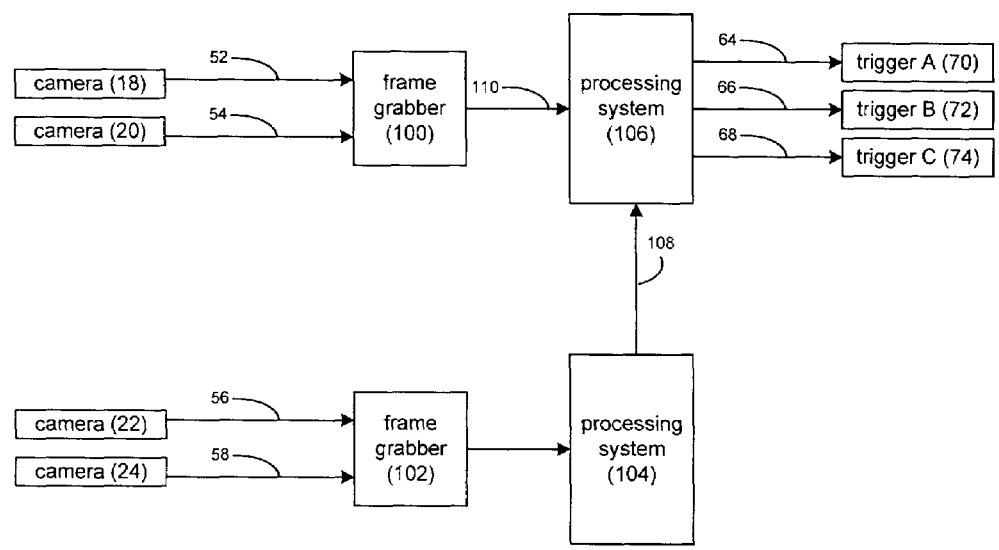
FIG. 3 is a diagrammatic view of one or more system level components of the machine vision system of FIG. 1.

Referring also to FIG. 3, machine vision system 10 may be configured to monitor incoming area 14 and outgoing area 24 separately. For example, machine vision system 10' may include a separate frame grabber 100, 102 for each pair of cameras. Specifically and in the embodiment shown in FIG. 3, a first frame grabber 100 is coupled to cameras 18, 20 (i.e., the cameras monitoring incoming area 14) and a second frame grabber 102 may be coupled to cameras 22, 24 (i.e., the cameras monitoring outgoing area 24).

A separate processing system may be used to process the signals received from the individual frame grabbers. For example, frame grabber 100 may receive and process inputs signals 52, 54 from incoming area cameras 18, 20 and frame grabber 102 may receive and process inputs signals 56, 58 from outgoing area cameras 22, 24. In this configuration, the monitoring of outgoing area 24 (and the related circuitry/components 108) is optional.

When configured to monitor both incoming area 14 and outgoing area 24, processing systems 104, 106 may be configured in a master/slave fashion. For example, processing system 104 may provide data signal 108 to processing system 106 (which also receives data signal 110 from frame grabber 100. Processing system 106 may process both data signals 108, 110 and provide one or more output signals (e.g., output signals 64, 66, 68) to one or more triggers 70, 72, 74. While processing system 104 is shown to be configured as a slave and processing system 106 is shown to be configured as a master, this is for illustrative purposes only and is not intended to be a limitation of this disclosure. Specifically, processing system 106 may be configured as a slave and processing system 104 may be configured as a master.

Concerning machine vision system 10 and/or machine vision system 10', one or more parameters of systems 10, 10' may be configured/defined at the time of manufacture and/or installation. This configuration/definition procedure may involve the calibration and computation of one or more intrinsic parameters for the cameras (e.g., cameras 18, 20, 22, 24) and the relative orientation between the cameras (e.g., cameras 18, 20, 22, 24). The calibration procedure may involve the solution of several sub-problems, each of which may have several solutions that are well understood by persons having ordinary skill in the art. As is also known in the art, rectification coefficients may be computed to enable run-time image correction.

Stereo measurements may be made in a coordinate system that is different from the coordinate systems of either camera. For example, the scene (or world) coordinates may correspond to the points within a viewed scene. Further, camera coordinates (e.g., both left and right) may correspond to the viewer-centered representation of scene points. Additionally, undistorted image coordinates may correspond to scene points projected onto the image plane. Further, distorted image coordinates may correspond to points having undergone lens distortion. And pixel coordinates may correspond to the grid of image samples in the image array.

With respect to machine vision systems 10, 10', one camera of any pair of cameras (e.g., camera pair 18, 20 and/or camera pair 22, 24) may be designated as a "reference camera" to which the stereo coordinate system is tied. An interior orientation process may be performed to determine the internal geometry of a camera and establish one or more of a plurality of parameters, which are often referred to as intrinsic parameters, examples of which may include but are not limited to: effective focal length (also referred to as the camera constant); location of the principal point (also referred to as the image center); radial distortion coefficients; and horizontal scale factor (also referred to as the aspect ratio). One or more of cameras 18, 20, 22, 24 may have fixed-focus lenses that cannot be modified. Accordingly, the above parameters may be computed and preset at the factory.

A relative orientation process may also be performed to determine the relative position and orientation between a pair of cameras (e.g., camera pair 18, 20 and/or camera pair 22, 24) from projections of calibration points in the scene. As discussed above, as these cameras are typically fixed with respect to each other, these parameters may be computed and preset at the factory.

A rectification processes, closely associated with the relative orientation, may also be performed. Rectification is the process of resampling stereo images so that epipolar lines correspond to image rows. See "An epipolar line on one stereo image corresponds to a given point in another stereo image is the perspective projection on the first stereo image of the three-dimensional ray that is the inverse perspective projection of the given point from the other stereo image" by Robert M. Haralick & Linda G. Shapiro, *Computer and Robot Vision Vol. II* 598 (1993).

If the left and right images are coplanar and the horizontal axes is collinear (no rotation about the optical axis), then the image rows are epipolar lines and stereo correspondences may be found along corresponding rows. These images, referred to as normal image pairs may provide computational advantages because the rectification of normal image pairs may only need to be performed once.

The method for rectifying the images may be independent of the representation used for the given pose of the two cameras. For example, the method for rectifying may rely on the principal that any perspective projection is a projective projection. Image planes corresponding to the two cameras are replaced by image planes with the desired geometry (normal image pair) while keeping the geometry of the rays spanned by the points and the projection centers in tact. This may result in a planar projective transformation. These coefficients may also be computed at the factory.

Given the parameters computed in interior orientation, relative orientation and rectification, the camera images may be corrected for distortion and misalignment in software and/or hardware. The resulting corrected images may have the geometry of a normal image pair i.e., square pixels, aligned optical planes, aligned axes (rows), and pinhole camera model.

An exterior orientation process may also be performed during factory set up of machine vision system 10, 10'. The exterior orientation process may be needed because 3d points in a viewed scene may only be known relative to the camera coordinate system. Exterior orientation may determine the position and orientation of a camera in an absolute coordinate system. An absolute 3d coordinate system may be established such that the X-Y plane corresponds to the ground plane and the origin is chosen to be an arbitrary point on the plane.

Ground plane calibration may be performed at the location of the installation. Calibration targets may be laid out on the floor to compute the relationship between the stereo coordinate system attached to the reference camera and the world (or scene) coordinates system attached to the ground plane. Ground plane calibration may also be performed at the factory or other ways known in the art.

Regions of interest may also be set up manually at the location of the installation. This procedure may involve capturing the image from the reference camera (i.e., the camera that the stereo coordinate system is tied to), rectifying the image, displaying the image, and then using a graphics overlay tool to specify the zones to be monitored. Multiple zones may be pre-selected to allow for different run-time algorithms to be run in each of the zones. The multiple zones may include particular 3d spaces of interest. Filtering may be performed to eliminate features outside of the zones being monitored. In alternative embodiments of machine vision system 10, automatic setup may be performed by laying out fiducial markings/tape on the floor.

Figure 4:
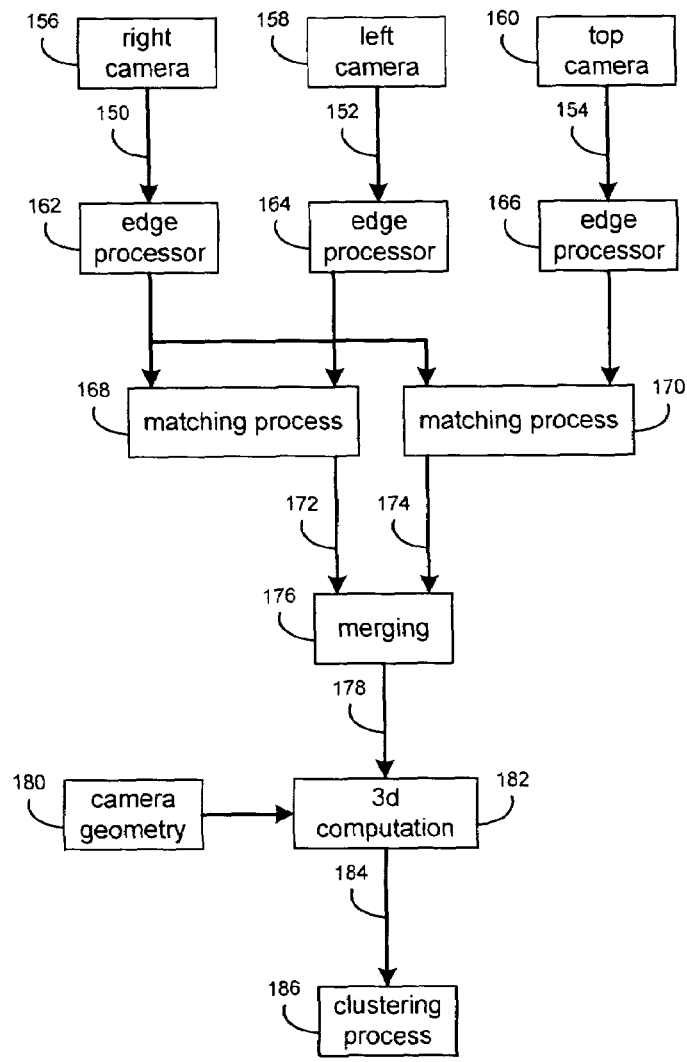
FIG. 4 is a flow chart of a process executed by the machine vision system of FIG. 1.

As is known in the art, there are several methods of performing stereo vision. Referring also to FIG. 4 and according to a particular embodiment of machine vision system 10, machine vision system 10 may acquire a set of input images 150, 152, 154 (i.e., Right, Left, Top) and may produce the 3d location of the edge and/or boundary points within the reference image. While inputs from three cameras 156, 158, 160 are shown in this particular example, this is for illustrative purposes only and is not intended to be a limitation of this disclosure. Specifically, the exact number of cameras included within machine vision system 10 may be adjusted based upon e.g., system requirements.

Machine vision system 10 may edge process 162, 164, 166 image signals 150, 152, 154 received from cameras 156, 158, 160. When edge processing 162, 164, 166 image signals 150, 152, 154, machine vision system 10 may execute a feature detection algorithm that may perform one or more of the following functions e.g., parabolic smoothing, non-integral sub-sampling (at a specific granularity), sobel edge detection, true peak detection, and chaining. This feature detection algorithm is known in the art and utilized in the Patmax product line manufactured by Cognex Corporation of Natick, Mass.

Edge processes 162, 164, 166 may result in a list of connected edgelets (i.e., chains). Only features that are included in long enough chains may be passed on for further processing. The exact chain length required may vary depending upon specific design criteria, personal preference and/or performance requirements, for example.

Matching process 168 may be used to match horizontal disparity features from right image signal 150 and left image signal 152. Matching process 170 may be used to match vertical disparity features from left image signal 152 and top image signal 154. The initial set of possible matches for each feature may be constrained using the epipolar constraint. A match between a feature in two images may then be characterized by an initial strength of match (SOM), which compares the strength and orientation of the edgelets.

Machine vision system 10 may enforce the smoothness constraint by limiting the allowable disparity gradient, which may provide a suitable balance between disambiguating power and the ability to deal with a wide range of surfaces. Limiting the allowable disparity gradient may involve updating the SOM of each match by looking at matches of the neighbors of the features under consideration.

Machine vision system 10 may utilize an iterative "winner-take-all" procedure. In one embodiment, the iterative "winner-take-all" procedure may perform one or more of the following functions. For each iteration, the feature matches having a maximum matching strength (i.e., for both of the individual features from which the feature match was formed) are chosen as correct. Machine vision system 10 may then discard all other feature matches that include the two above-described individual features (due to the uniqueness constraint). Machine vision system 10 may then continue to match other features based upon e.g. matching strength. Matching processes 168, 170 may provide matching signals 172, 174 to merging process 176. Matching signals 172, 174 may define the Cartesian (i.e., x, y) coordinates of the various feature matches defined above and located within e.g., image signals 150, 152, 154. Matching signals 172, 174 may also define horizontal and vertical disparities and the angular orientation of matched features.

Merging process 176 may merge the horizontal and the vertical disparities to produce consolidated output 178. Merging process 176 may occur in various ways. For example, a multiplexing scheme may be used. For example, if the angular orientation of the feature is 45-135° or 225-315°, the horizontal disparities are used; otherwise the vertical disparities are used. Note that if only two cameras are used (as shown in FIGS. 1-3) then merging process 176 may not be needed. Consolidated output 178 may define a plurality of feature points with disparities.

Once consolidated output 178 is generated and camera geometry 180 is known (due to the above-described calibration process), a 3d computation process 182 may generate the 3d coordinates 184 (i.e., X, Y, Z) of the various points in either of the camera/scene coordinate systems.

A clustering process 186 may return distinct 3D objects in the scene, such that each object contains a mutually exclusive subset of the 3D boundary points output by the stereo algorithm.

Matching methods may be classified as feature-based matching methods (as the one described above) and area-based matching methods. Feature-based matching methods are more view-point tolerant but produce more sparse results. Area-based matching methods produce dense results but are less view-point tolerant. Area-based matching methods may also have a highly regular algorithmic structure; thus are more easily optimized. Examples of commonly known correlation measures used by third party systems may include the SAD (Sum of Absolute differences) of the LOG (Laplacian of Gaussian) transformed image.

A dense disparity image map may be processed using standard image processing techniques, examples of which may include but are not limited to: histograms, and blob connectivity, to determine if there is significant height above the ground plane. However, these methodologies may provide only crude estimates. Therefore, it may be desirable to convert the dense disparity image map into a sparse point cloud. This may be achieved by considering only "valid" disparity pixels within the dense disparity image map.

Figure 5:
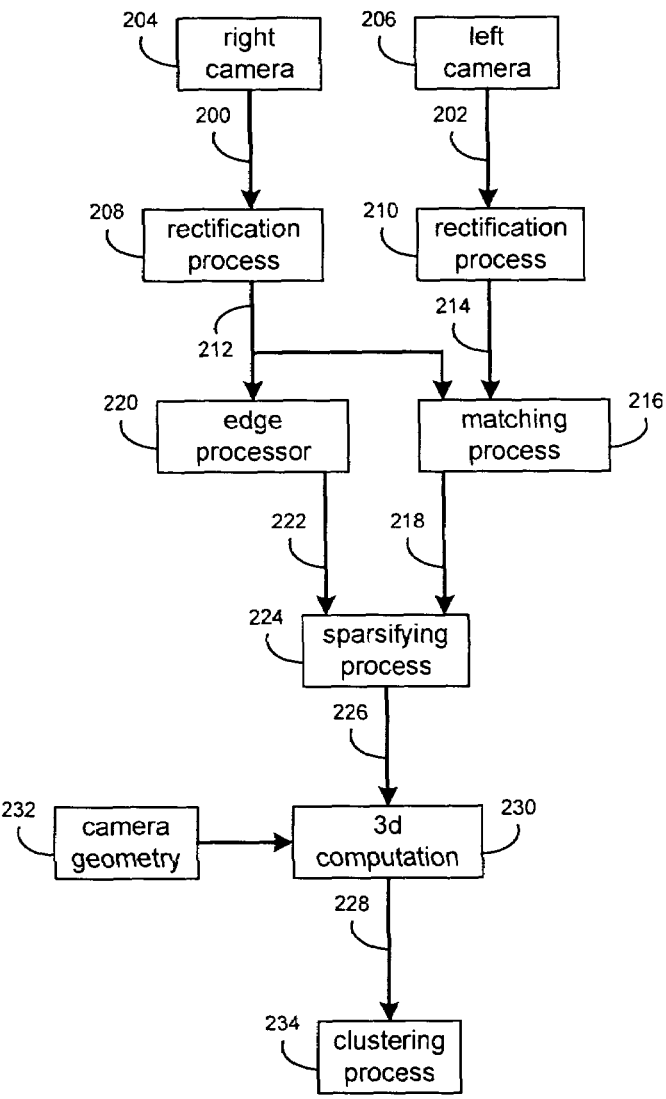
FIG. 5 is a flow chart of a process executed by the machine vision system of FIG. 1.

Referring also to FIG. 5 and according to a particular embodiment of machine vision system 10', machine vision system 10' may be configured to produce sparse disparities using a third-party system. Machine vision system 10' may focus on the boundary points or edges (due to occlusion and reflectance), as the information is most reliable at these points. Right image 200 and left image 202 received from right and left cameras 204, 206 (respectively) may be provided to rectification processes 208, 210 (respectively) to produce rectified signals 212, 214. Rectified signals 212, 214 may be provided to matching process 216, which generates dense disparity map signal 218.

While inputs from two cameras 204, 206 are shown in this particular example, this is for illustrative purposes only and is not intended to be a limitation of this disclosure. Specifically, the exact number of cameras included within machine vision system 10' may be adjusted based upon e.g., system requirements.

Right data signal 212 may also be provided to edge processor 220 and processed in the manner described above. The output 222 of edge processor 220 may be provided to sparsifying process 224 for mapping onto dense disparity map signal 218 to evaluate disparities at the feature locations defined within output 222. The output 226 of sparsifying process 224 may be a plurality of feature points with disparities that may be converted to 3d coordinates 228 (i.e., X, Y, Z) by 3d computation process 230 through the use of camera geometry 232.

A clustering process 234 may return distinct 3D objects in the scene, such that each object contains a mutually exclusive subset of the 3D boundary points output by the stereo algorithm.

Figure 6:
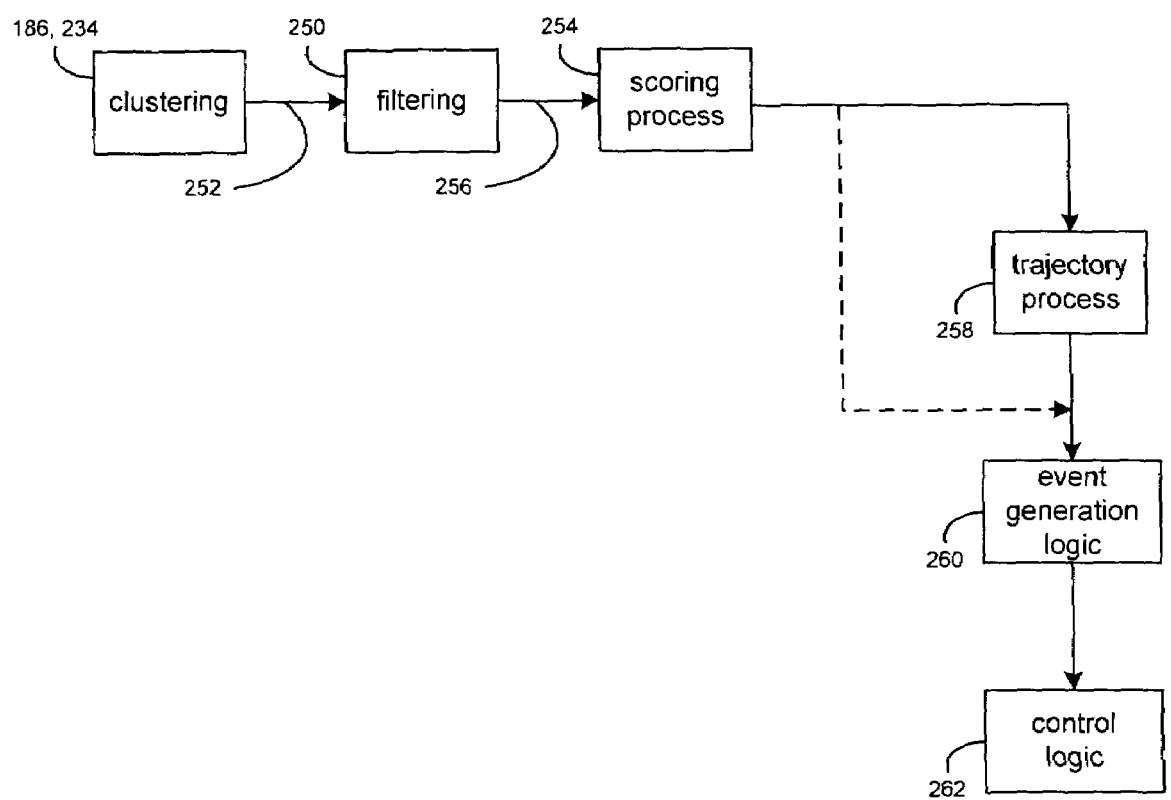
FIG. 6 is a flow chart of a process executed by the machine vision system of FIG 1.

The various processes executed by machine vision processes 10, 10' may generate feature points (edges or boundary points) with 3d information at these points (i.e., in the form of 3d coordinates 184 (FIG. 4) and/or 3d coordinates 228 (FIG. 5). This 3d information may be processed in accordance with the methodology disclosed in FIG. 6 (as will be discussed below in greater detail).

This 3d information may be transformed from a camera-centric coordinate system to a world coordinate system, which is attached to the ground plane. Optionally, this 3d information may be clustered, using clustering process 186 (discussed above) and/or clustering process 234 (discussed above), such that the 3d points at the features in the image are extracted and segmented into mutually exclusive subsets. Each subset may correspond to a distinct object in the scene.

Concerning clustering process 186 and/or clustering process 234, standard clustering techniques may be used to form clusters of the 3D points. For example, agglomerative hierarchical clustering techniques may be utilized by machine visions processes 10' 10. Using agglomerative hierarchical clustering techniques, initial clusters may be first achieved by using the chain organization of the edgelets. The chains of features may be broken into contiguous segments based upon abrupt changes along the z-axis between successive points. This is based upon the theory that if the segments are contiguous in image coordinates and have similar z-axis values, the segments correspond to the same object and hence the same cluster, for example.

Each of these segments now corresponds to a potentially separate cluster. The two closest clusters may be merged based upon a "minimum distance" criteria, which is akin to a greedy minimum spanning tree algorithm. Specifically, the algorithm iterates until the desired number of clusters are obtained or the "minimum distance" is greater than a certain threshold.

While the above-described clustering technique clusters in 3D, this is for illustrative purposes only and is not intended to be a limitation of this disclosure. For example, the above-described clustering technique may cluster in 2d provided constraints are used. For example, a constraint may be used to position the objects within a single plane of a 3d space.

The criteria for segmentation into distinct objects is that the minimum distance between the objects along a particular plane (i.e., the 2d distance) may exceed a preset spacing threshold. Therefore, it is implicit that the projections of the objects in the 2d plane do not overlap. This may prove to be not very disadvantageous, as the objects lie on the plane and the surfaces of the object are generally normal to the plane.

Machine vision process 10, 10' may filter 250 clustered signal 252 to e.g., remove all points that are within a certain distance from the ground. In a typical embodiment, filtering process 250 may remove all data points that are within six inches of the ground. By filtering 250 these data points that are close to the ground, situations in which e.g., passageway 12 (FIG. 1) is unnecessarily opened may be reduced. For example, if data points within e.g., six inches of the ground are filtered 250, situations such as a shadow passing in front of the door or a leaf blowing past the door in a windstorm won't result in passageway 12 opening. As will be discussed below in greater detail, the 3d space monitored by machine vision systems 10, 10' may be segmented into a plurality of horizontally displaced 3d spaces, in which machine vision system 10, 10' reacts differently in response to the presence of data points within the 3d spaces.

Specifically, any points masked out by the regions of interest that were setup during installation may be ignored by machine vision system 10, 10'. Since a 3D coordinate system may first be attached to the ground plane, the surface normal to the ground plane may be defined as the z-axis. Since objects may be constrained to lie in a known plane (e.g., the x-y plane that lies six inches about the ground plane), objects may be segmented based upon e.g., their relative displacement within the above-described x-y plane.

Continuing with the above-stated example, machine vision system 10, 10' may convert all 3d points to the above-described ground plane coordinate system. Machine vision system 10, 10' may filter 250 all points that are e.g., too distant or close (i.e., displaced along the x-axis), too far left or right (i.e., displaced along the y-axis), too high or too low (i.e., displaced along the z-axis). By filtering 250 these points, situations in which passageway 12 is unnecessarily opened may be reduced. Accordingly, the points that are not filtered 250 are all located within the relevant portions of the 3d dimensional space (X, Y, Z) and/or the relevant portions of the 2d plane. As discussed above, these remaining points may be projected onto the ground plane (wherein the ground plane in this particular example is located six inches above ground level) to convert them to a 2d image and e.g., blob connectivity may be used to define distinct regions, which may be a collection of pixels that represents a plurality of feature points.

Machine vision process 10, 10' may include a scoring process 254 for scoring the filtered signal 256 using a scoring function. The score generated by scoring process 254 may be accumulated and compared to a predetermined threshold to determine if an object is present or absent within e.g., the relevant 3d space and/or the relevant 2d plane. In a illustrative embodiment, the score generated by scoring process 254 may be accumulated independently for each cluster. The above-described threshold may be applied to each cluster (as opposed to all the points that are generated). Using this "cluster scoring" methodology may produce a more robust result set, especially if the scene produces considerable isolated false matches.

Once a cluster has been detected and scoring process 254 has assigned a score that is equal to or above the above-described predetermined threshold, trajectory process 258 may determine the motion vector of the detected cluster to further qualify the result (i.e., to determine whether the object is headed towards passageway 12. Specifically, if a person is walking past the door in the direction of the y-axis, passageway 12 need not be opened. Accordingly, only opening passageway 12 in response to clusters having a motion vector in the direction of passageway 12 may result in a reduction in passageway 12 being unnecessarily opened.

A motion vector includes both a direction component and a magnitude component. Accordingly, a trajectory process 258 may be employed to determine object motion by estimating the 2d motion field or the optical flow (apparent motion) in a set of frames in an image sequence.

One known motion estimation technique involves element tracking, such that elements are followed through time using frame-by-frame motion estimates and/or by implicitly deriving such estimates. Block-matching schemes (used extensively in motion compensation and video compression) or area correlation schemes (as used in stereo matching) may be used to estimate motion between frames.

In a illustrative embodiment, techniques may be utilized that employ both feature-based correlation and area-based correlation. Being that points that belong to an object are already segmented in a given frame, these points may be identified in a subsequent frame by correlating these points in an area around the expected object position (within the subsequent frame). For example, @ time t-1, each object feature point may contain a weight, an x-y location, and a direction. @ time t, the rectified reference image may be considered to be the "run time image". This image may be processed by an edge processor to produce a gradient magnitude (i.e., indicative of object speed) and angle images (i.e., indicative of object direction). During a coarse correlation step, the train probes may be correlated with the angle image and the correlation measure being used may be the sum of absolute differences. During a fine correlation step, the magnitude image may be used to produce a sharper correlation peak.

Once a motion vector is computed from e.g., frames @ t-1 and frame @ t for a given object, correspondence may be known between the various object points. Since the 3d locations of these points are known, 3d motion may be optionally computed. The algorithm may be trivially extended to multiple frames to get a smoothed trajectory by assuming straight line motion of objects. Another extension of the algorithm is the use of filtering techniques. The results may be filtered using the current input, past inputs and/or past outputs to produce the current output. Further, Kalman filters may be utilized. See "A New Approach to Linear Filtering and Prediction Problems" by R. E. Kalman, *Transactions of the ASME* (March 1960), which is herein incorporated by reference. The Kalman filter may be a powerful technique for doing incremental, real-time estimation in dynamic systems, as it allows for the integration of information over time and is robust with respect to both system and sensor noise.

Trajectory process 258 may process the computer motion vector to determine if the detected object is moving toward passageway 12. If it is determined that the detected object is moving toward passageway 12, an output signal may be provided to event generation logic 260.

Event generation logic 260 may receive the output signal of trajectory process 258 (i.e., if a trajectory process is utilized) or scoring process 254 (if a trajectory process is not utilized) and may generate the appropriate signal that is provided to e.g., control logic 262 for passageway 12, which may e.g., open passageway 12. The output provided from event generation logic 260 to control logic 262 may vary depending on numerous factors, examples of which may include but are not limited to: the door type; the presence of the optional outgoing area system; the number and/or type of algorithms in use. As will be discussed below in greater detail, event generation logic 260 may receive input signals from multiple zones and may provide different signals to control logic 262 depending on the zone from which the input signal was received. Accordingly, the combination of event generation logic 260 and control logic 262 may receive signals indicative of activities within multiple zones and may provide signals that provide efficient control of passageway 12.

As discussed above, machine vision process 10, 10' may filter 250 clustered signal 252 to e.g., remove all points that are within a certain distance from the ground. For example, if data points within e.g., six inches of the ground are filtered 250, situations such as a shadow passing in front of the door or a leaf blowing past the door in a windstorm won't result in the passageway 12 opening. Further and as discussed above, the 3d space monitored by machine vision systems 10, 10' may be segmented into a plurality of horizontally displaced spaces, in which machine vision system 10, 10' reacts differently in response to the presence of data points within those spaces.

Figure 7:
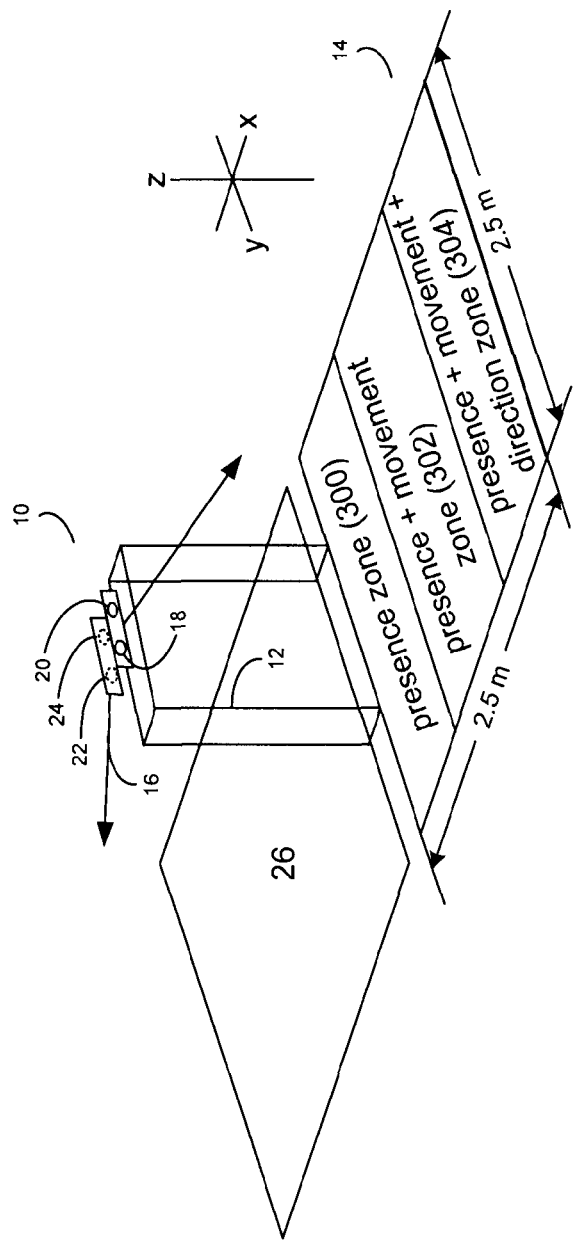
FIG. 7 is a diagrammatic view of an alternative embodiment machine vision system.

Referring also to FIG. 7, there is shown a system in which incoming area 14 (e.g., the area directly in front of passageway 12) is divided into three activity zones, namely: presence activity zone 300; movement activity zone 302; and direction activity zone 304. Outgoing area 26 may also be divided. Specifically, by dividing incoming area 14 into a plurality of discrete activity zones (zones e.g., 300, 302, 304), machine vision system 10, 10' may be configured to react differently depending on the specific activity zone in which an object-related event occurs. Examples of such object-related events may include but are not limited to: a presence-related event; a movement-related event; and a direction-related event.

A presence-related event may be defined as an event in which an object is detected within incoming area 14. A movement-related event may be defined as an event in which an object is detected within incoming area 14 and the detected object is moving. A direction-related event may be defined as an event in which an object is detected within incoming area 14 and the detected object is moving in the direction of passageway 12.

Figure 8:
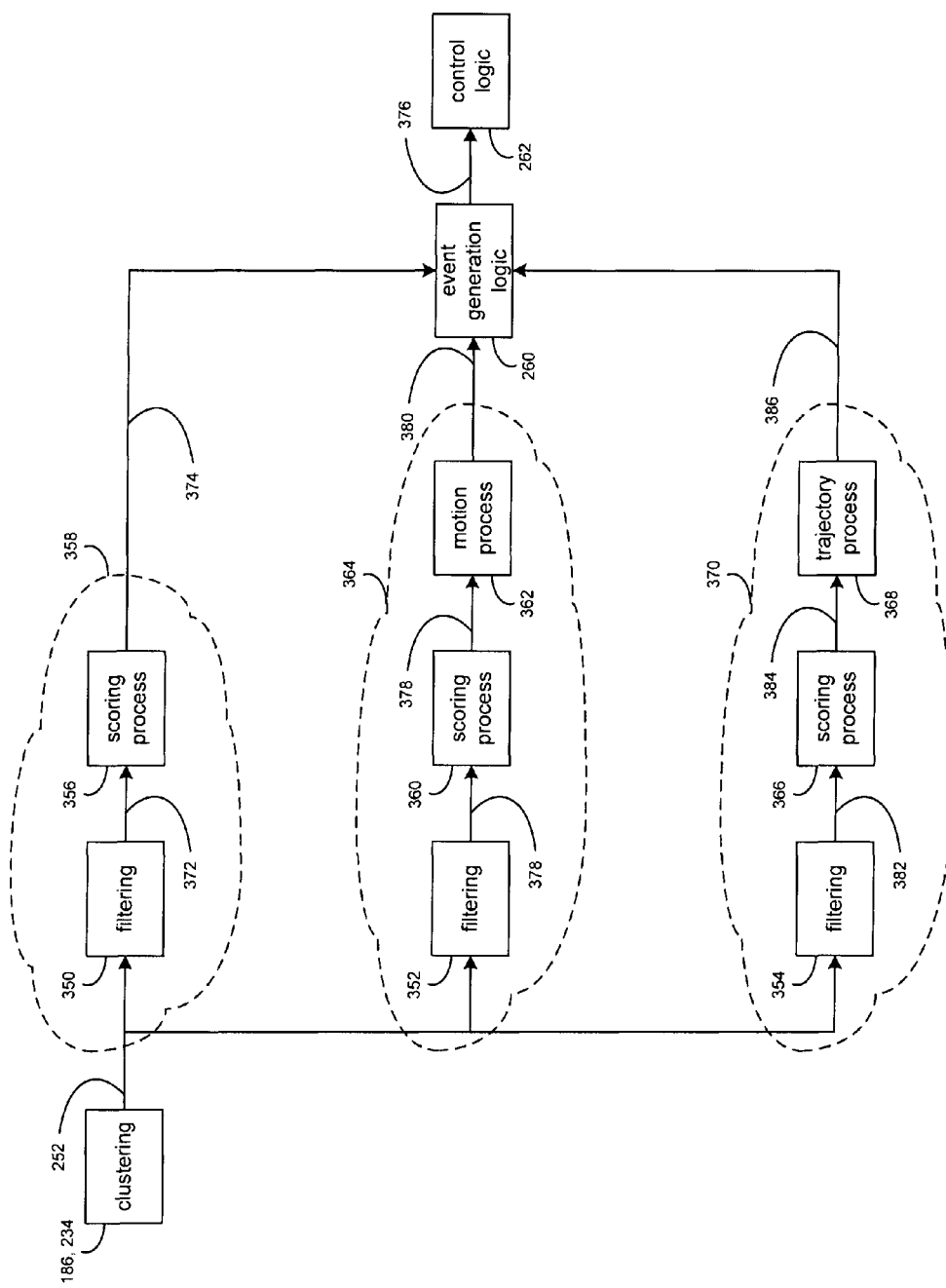
FIG. 8 is a flow chart of a process executed by the machine vision system of FIG

Referring also to FIG. 8, machine vision system 10, 10' may utilize a plurality of distinct filtering processes to remove all points that lie outside of a particular activity zone. For example, filter 350 may remove all points that lie outside of presence activity zone 300. Filter 352 may remove all points that lie outside of movement activity zone 302. Filter 354 may remove all points that lie outside of direction activity zone 304.

The combination of filter 350 and scoring process 356 may form presence activity zone detector 358. The combination of filter 352, scoring process 360, and motion process 362 may form movement activity zone detector 364. The combination of filter 354, scoring process 366, and trajectory process 368 may form direction activity zone detector 370.

Accordingly and concerning presence activity zone detector 358, filter 350 may remove all points that lie outside of presence activity zone 300. Therefore, presence activity zone detector 358 may only process object-related events that occur within presence activity zone 300. Scoring process 356 may score filtered signal 372 using a scoring function. The score generated by scoring process 356 may be accumulated and compared to a predetermined threshold to determine if an object is present or absent within e.g., presence activity zone 300. In a illustrative embodiment, the score generated by scoring process 356 may be accumulated independently for each cluster. The above-described threshold may then be applied to each cluster (as opposed to all the points that are generated). Using this "cluster scoring" methodology may produce a more robust result set, especially if the scene produces considerable isolated false matches. Once a cluster has been detected and scoring process 356 has assigned a score that is equal to or above the above-described predetermined threshold, output signal 374 may be provided to event generation logic 260, which may provide open signal 376 to control logic 262 for passageway 12, which may e.g., open passageway 12. Accordingly, for presence activity zone 300, the mere presence of an object within presence activity zone 300 may result in passageway 12 opening. Accordingly, movement of the object may not be required to open passageway 12.

Accordingly and concerning movement activity zone detector 364, filter 352 may remove all points that lie outside of movement activity zone 302. Therefore, movement activity zone detector 364 may only process object-related events that occur within movement zone activity 302. Scoring process 360 may score filtered signal 378 using a scoring function. The score generated by scoring process 360 may be accumulated and compared to a predetermined threshold to determine if an object is present or absent within e.g., movement activity zone 302. In a illustrative embodiment, the score generated by scoring process 360 may be accumulated independently for each cluster. The above-described threshold may then be applied to each cluster (as opposed to all the points that are generated). Using this "cluster scoring" methodology may produce a more robust result set, especially if the scene produces considerable isolated false matches.

Once a cluster has been detected and scoring process 360 has assigned a score that is equal to or above the above-described predetermined threshold, scored signal 378 may be provided to motion process 362. Motion process 362 may be configured to detect motion without concern for the direction of the motion. For example, motion process 362 may be configured similarly to the above-described trajectory process 258 but may merely determine the magnitude component of the above-described motion vector and not be concerned with the direction component of the above-described motion vector. Alternatively, motion process 362 may be configured essentially identically to trajectory process 258 and may determine the complete motion vector (i.e., the magnitude component and the direction component), but may only utilize the magnitude component.

In a illustrative embodiment and as discussed above, motion process 362 may utilize techniques that employ both feature-based correlation and area-based correlation. Being that points that belong to an object are already segmented in a given frame, these points may be identified in a subsequent frame by correlating these points in an area around the expected object position (within the subsequent frame). For example, @ time t-1, each object feature point may contain a weight, an x-y location, and a direction. @ time t, the rectified reference image may be considered to be the "run time image". This image may be processed by an edge processor to produce a gradient magnitude (i.e., indicative of object speed) and angle images (i.e., indicative of object direction).

Motion process 362 may then process the gradient magnitude to determine if the gradient magnitude is greater than zero, thus indicating object motion. If object motion has been detected, output signal 380 may be provided to event generation logic 260, which may provide open signal 376 to control logic 262 for passageway 12, which may e.g., open passageway 12. Accordingly, for movement activity zone 302, the presence of a moving object within movement activity zone 300 may result in passageway 12 opening. Accordingly, the specific direction of the movement of the object is not considered when determining whether to open passageway 12.

Accordingly and concerning direction activity zone detector 370, filter 354 may remove all points that lie outside of direction activity zone 304. Therefore, direction activity zone detector 370 may only process object-related events that occur within direction activity zone 304. Scoring process 366 may score filtered signal 382 using a scoring function. The score generated by scoring process 366 may be accumulated and compared to a predetermined threshold to determine if an object is present or absent within e.g., direction activity zone 304. In a illustrative embodiment, the score generated by scoring process 366 may be accumulated independently for each cluster. The above-described threshold may then be applied to each cluster (as opposed to all the points that are generated). Using this "cluster scoring" methodology may produce a more robust result set, especially if the scene produces considerable isolated false matches. Once a cluster has been detected and scoring process 366 has assigned a score that is equal to or above the above-described predetermined threshold, scored signal 384 may be provided to trajectory process 368.

Trajectory process 368 (i.e., which may be similar to trajectory process 258) may determine the motion vector of the detected cluster to further qualify the result (i.e., to determine whether the object is headed towards passageway 12). Specifically, if a person is walking past the door in the direction of the y-axis, passageway 12 need not be opened. Accordingly, only opening passageway 12 in response to clusters having a motion vector in the direction of passageway 12 may result in a reduction in passageway 12 being unnecessarily opened.

As discussed above, a motion vector includes both a direction component and a magnitude component. Accordingly, trajectory process 368 may be employed to determine object motion by estimating the 2d motion field or the optical flow (apparent motion) in a set of frames in an image sequence. As is known in the art, motion may be estimated using a variety of techniques.

In a illustrative embodiment, techniques may be utilized that employ both feature-based correlation and area-based correlation. Being that points that belong to an object are already segmented in a given frame, these points may be identified in a subsequent frame by correlating these points in an area around the expected object position (within the subsequent frame). For example, @ time t-1, each object feature point may contain a weight, an x-y location, and a direction. @ time t, the rectified reference image may be considered to be the "run time image". This image may be processed by an edge processor to produce a gradient magnitude (i.e., indicative of object speed) and angle images (i.e., indicative of object direction).

Once a motion vector is computed from e.g., frames @ t-1 and frame @ t for a given object, correspondence may be known between the various object points. Since the 3d locations of these points are known, 3d motion may be optionally computed. The algorithm may be trivially extended to multiple frames to get a smoothed trajectory by assuming straight line motion of objects. Another extension of the algorithm is the use of filtering techniques. The results may be filtered using the current input, past inputs and/or past outputs to produce the current output. Further, Kalman filters may be utilized. See "A New Approach to Linear Filtering and Prediction Problems" by R. E. Kalman, *Transactions of the ASME* (March 1960), which is herein incorporated by reference. The Kalman filter may be a powerful technique for doing incremental, real-time estimation in dynamic systems, as it allows for the integration of information over time and is robust with respect to both system and sensor noise.

Trajectory process 368 may process the computer motion vector to determine if the detected object is moving toward passageway 12. If it is determined that the detected object is moving toward passageway 12, output signal 386 may be provided to event generation logic 260, which may provide open signal 376 to control logic 262 for passageway 12, which may e.g., open passageway 12. Accordingly, for direction activity zone 304, the presence of a object moving in the direction of passageway 12 may result in passageway 12 opening.

While the machine vision system 10, 10' is described above as defining three activity zones 300, 302, 304, this is for illustrative purpose only and is not intended to be a limitation of this disclosure. Specifically, the number of activity zones may be increased/decreased in accordance with various design criteria.

The actual inner workings of such a machine vision system as described herein simply outline a illustrative approach as there is considerable amount of literature and state of the art for these topics. Therefore, one could easily use a custom algorithm for any of the pieces to build a machine vision system.

Although various calibration methods are described herein in terms of illustrative embodiments of the disclosure, persons having ordinary skill in the art should appreciate that any number of calibration methods may be used without departing from the spirit and scope of the disclosure. Although the illustrative embodiment described herein is setup in the factory using factory setup procedures, persons having ordinary skill in the art should appreciate that any of the described setup steps may also be performed in the field without departing from the scope of the disclosure.

Although an interior orientation process determines the internal geometry of cameras in terms of e.g., the camera constant, the image center, radial distortion coefficients and aspect ratio, persons having ordinary skill in the art should appreciate that additional intrinsic parameters may be added or some of these parameters ignored in alternative embodiments within the scope of the present disclosure.

Although ground plane calibration in the illustrative embodiments described herein is performed at the location of installation, persons having ordinary skill in the art should appreciate that ground plane calibration may also be performed in the factory or at alternate locations without departing from the spirit and scope of the disclosure. Further, ground plane calibration can replaced with post-processing of the data or other software methods.

Although edge processing is performed in the illustrative embodiments described herein by performing parabolic smoothing, non-integral sub sampling (at specific granularity) sobel edge detection followed by true peak detection and chaining, persons having skill in the art should appreciate that any number of edge processing methods known in the art may be used in the edge processing step without departing from the spirit and scope of the present disclosure.

Although the matching step of an illustrative embodiment is described herein wherein matching features are characterized by a strength of match followed by implementing a smoothness constraint, persons having ordinary skill in the art should appreciate that various alternatives matching processes may be substituted without departing from the spirit and scope of the present disclosure.

Although the illustrative embodiment of the present disclosure is described herein, including a merging step using a simple multiplexing scheme having specific orientation limits from which to distinguish horizontal disparities from vertical disparities, persons having ordinary skill in the art should appreciate that these limits are somewhat arbitrary and may be widened/narrowed without departing from the spirit and scope of the present disclosure.

Although illustrative embodiments of the present disclosure are described generally in terms of monitoring a passageway for triggering an event, persons having skill in the art should envision any number of alternative embodiments of the present disclosure in security, safety, motion control and various other applications. For example, a machine vision system may be used according to the present disclosure to trigger an alarm when a person or object enters a particular area or moves in a particular direction within that area or passageway. An alternative illustrative embodiment of the disclosure for example, could trigger an alert signal or close a gate if an automobile is detected traveling in the wrong direction on a highway or exit ramp.

Although the disclosure is described herein in terms of a multiple camera machine vision system, persons skilled in the art should appreciate that a single camera may be used to take two or more images from different locations to provide stereo images within the scope of the disclosure. For example, a camera could take separate images from a plurality of locations. Alternatively, a plurality of optical components could be arranged to provide a plurality of consecutive views to a stationary camera for use as stereo images according to the disclosure. Such optical components may include reflective optical components, for example, mirrors, and refractive optical components, for example, lenses.

Although the disclosure has been shown and described with respect to exemplary embodiments thereof, persons having ordinary skill in the art should appreciate that various other changes, omissions and additions in the form and detail thereof may be made therein without departing from the spirit and scope of the disclosure.

A number of implementations have been described. Nevertheless, it will be understood that various modifications may be made. Accordingly, other implementations are within the scope of the following claims.

What is claimed is:

1. A method comprising:
monitoring an activity area proximate an actuated passageway for the occurrence of an object-related event, wherein:

the activity area includes a first activity zone, a second activity zone, and at least a third activity zone, the first, second, and third activity zones are essentially parallel to and exclusive of each other, and the actuated passageway is actuatable with a control signal; detecting the occurrence of an object-related event within the activity area; if the object-related event occurs within the first activity zone, executing a first algorithm to generate the control signal;

if the object-related event occurs within the second or at least the third activity zone, executing a second algorithm to generate the control signal, wherein the first activity zone is a presence activity zone, the second activity zone is a movement activity zone, and the third activity zone is a direction activity zone.

2. The method of claim 1 wherein the object-related event is chosen from the group consisting of a presence-related event; a movement- related event; and a direction-related event.

3. The method of claim 1 further comprising:

if the object-related event is a presence-related event that occurs in the presence activity zone, generating an open control signal that is provided to the actuated passageway;

if the object-related event is a movement-related event that occurs in the movement activity zone, generating an open control signal that is provided to the actuated passageway; and if the object-related event is a direction-related event that occurs in the direction activity zone, generating an open control signal that is provided to the actuated passageway.

4. The method of claim 1 wherein the activity area includes a ground level activity zone, the method further comprising:

if the object-related event occurs within the ground level activity zone, executing a third algorithm to generate the control signal.

5. A computer program product residing on a computer readable medium having a plurality of instructions stored thereon that, when executed by a processor, cause the processor to perform operations comprising:

monitoring an activity area proximate an actuated passageway for the occurrence of an object-related event, wherein:

the activity area includes a first activity zone, a second activity zone, and at least a third activity zone, the first, second, and third activity zones are essentially parallel to and exclusive of each other, and the actuated passageway is actuatable with a control signal; detecting the occurrence of an object-related event within the activity area;

if the object-related event occurs within the first activity zone, executing a first algorithm to generate the control signal; and if the object-related event occurs within the second or at least the third activity zone, executing a second algorithm to generate the control signal, wherein the first activity zone is a presence activity zone, the second activity zone is a movement activity zone, and the third activity zone is a direction activity zone.

6. The computer program product of claim 5 wherein the object-related event is chosen from the group consisting of a presence-related event; a movement-related event; and a direction-related event.

7. The computer program product of claim 5 further comprising instructions for:

if the object-related event is a presence-related event that occurs in the presence activity zone, generating an open control signal that is provided to the actuated passageway;

if the object-related event is a movement-related event that occurs in the movement activity zone, generating an open control signal that is provided to the actuated passageway; and if the object-related event is a direction-related event that occurs in the direction activity zone, generating an open control signal that is provided to the actuated passageway.

8. The computer program product of claim 5 wherein the activity area includes a ground level activity zone, the computer program product further comprising instructions for: if the object-related event occurs within the ground level activity zone, executing a third algorithm to generate the control signal.

9. A machine vision system comprising: a plurality of cameras; and logic circuitry responsive to the plurality of cameras, the logic circuitry configured for:

monitoring an activity area proximate an actuated passageway for the occurrence of an object-related event, wherein:

the activity area includes a first activity zone, a second activity zone, and at least a third activity zone, the first, second, and third activity zones are essentially parallel to and exclusive of each other, and and the actuated passageway is actuatable with a control signal;

detecting the occurrence of an object-related event within the activity area;

if the object-related event occurs within the first activity zone, executing a first algorithm to generate the control signal; and if the object-related event occurs within the second or at least the third activity zone, executing a second algorithm to generate the control signal, wherein the first activity zone is a presence activity zone, the second activity zone is a movement activity zone, and the third activity zone is a direction activity zone.

10. The machine vision system of claim 9 wherein the object-related event is chosen from the group consisting of a presence-related event; a movement-related event; and a direction-related event.

11. The machine vision system of claim 9 wherein the logic circuitry is further configured for:

if the object-related event is a presence-related event that occurs in the presence activity zone, generating an open control signal that is provided to the actuated passageway;

if the object-related event is a movement-related event that occurs in the movement activity zone, generating an open control signal that is provided to the actuated passageway; and if the object-related event is a direction-related event that occurs in the direction activity zone, generating an open control signal that is provided to the actuated passageway.

12. The machine vision system of claim 9 wherein the activity area includes a ground level activity zone, the logic circuitry being further configured for: if the object-related event occurs within the ground level activity zone, executing a third algorithm to generate the control signal.

* * * * *